United States Patent
Christensen et al.

(10) Patent No.: US 6,742,136 B2
(45) Date of Patent: May 25, 2004

(54) REDUNDANT DEVICES IN A PROCESS CONTROL SYSTEM

(75) Inventors: Dan Dean Christensen, Austin, TX (US); Steve D. Bonwell, Austin, TX (US); Brian Alan Franchuk, Richfield, MN (US); Stephen Anthony Zielinski, Savage, MN (US); Craig Robert Tielens, Minneapolis, MN (US)

(73) Assignee: Fisher-Rosemount Systems Inc., Austin, TX (US)

( * ) Notice: Subject to any disclaimer, the term of this patent is extended or adjusted under 35 U.S.C. 154(b) by 624 days.

(21) Appl. No.: 09/730,356

(22) Filed: Dec. 5, 2000

(65) Prior Publication Data

US 2002/0083364 A1 Jun. 27, 2002

(51) Int. Cl.$^7$ .............................................. G06F 11/00
(52) U.S. Cl. .......................................................... 714/5
(58) Field of Search .............................. 714/5, 7, 9, 13; 712/32; 700/2, 3, 8, 21

(56) References Cited

U.S. PATENT DOCUMENTS

| | | | | |
|---|---|---|---|---|
| 5,638,507 A | * | 6/1997 | Akai et al. ..................... 714/13 |
| 5,819,050 A | * | 10/1998 | Boehling et al. ........... 710/104 |
| 6,047,222 A | * | 4/2000 | Burns et al. ................... 700/79 |
| 6,148,348 A | * | 11/2000 | Garnett et al. ................ 710/14 |
| 6,360,277 B1 | * | 3/2002 | Ruckley et al. ............. 709/250 |
| 6,445,963 B1 | * | 9/2002 | Blevins et al. ................ 700/44 |
| 6,522,934 B1 | * | 2/2003 | Irwin et al. .................... 700/11 |
| 6,542,924 B1 | * | 4/2003 | Abe ........................... 709/208 |
| 2001/0056304 A1 | | 12/2001 | Nitta ............................ 700/21 |

FOREIGN PATENT DOCUMENTS

EP  1 006 423 A1  6/2000

* cited by examiner

Primary Examiner—Nadeem Iqbal
Assistant Examiner—Timothy M Bonura
(74) Attorney, Agent, or Firm—Marshall, Gerstein & Borun LLP

(57) ABSTRACT

A method of and a device for implementing redundancy in a process control network using a pair of redundant devices, such as redundant I/O devices, communicatively connected to a segment of the bus in parallel to each other and in series between the controller and field devices on the segment. The redundant devices are assigned a virtual publishing address, which may be the unique address of one of the redundant devices, that is used in communicating over the bus. At all times, one of the redundant devices is operating in an active mode and communicating with the devices in process control network, and the other redundant device is operating in a backup mode wherein the redundant device maintains a communication connection with the devices and listens for messages transmitted by the devices and intended for the redundant devices, but does not respond to messages from the other devices until the device switches to the active mode.

44 Claims, 6 Drawing Sheets

REDUNDANT DEVICES IN A PROCESS CONTROL SYSTEM

FIELD OF THE INVENTION

The present invention relates generally to process control networks and, more specifically, to a method of and to an apparatus for implementing redundant devices in a process control network.

DESCRIPTION OF THE RELATED ART

Large processes such as chemical, petroleum, and other manufacturing and refining processes include numerous field devices disposed at various locations to measure and control parameters of the process to thereby effect control of the process. These field devices maybe, for example, sensors such as temperature, pressure, and flow rate sensors as well as control elements such as valves and switches.

Historically, the process control industry used manual operations like manually reading level and pressure gauges, turning valve wheels, etc., to operate the measurement and control field devices within a process. Beginning in the 20th century, the process control industry began using local pneumatic control, in which local pneumatic controllers, transmitters, and valve positioners were placed at various locations within a process plant to effect control of certain plant locations. With the emergence of the microprocessor-based distributed control system (DCS) in the 1970's, distributed electronic process control became prevalent in the process control industry.

As is known, a DCS includes an analog or a digital computer, such as a programmable logic controller, connected to numerous electronic monitoring and control devices, such as electronic sensors, transmitters, current-to-pressure transducers, valve positioners, etc. located throughout a process. The DCS computer stores and implements a centralized and, frequently, complex control scheme to effect measurement and control of devices within the process to thereby control process parameters according to some overall control scheme. Usually, however, the control scheme implemented by a DCS is proprietary to the DCS controller manufacturer which, in turn, makes the DCS difficult and expensive to expand, upgrade, reprogram, and service because the DCS provider must become involved in an integral way to perform any of these activities. Furthermore, the equipment that can be used by or connected within any particular DCS maybe limited due to the proprietary nature of DCS controller and the fact that a DCS controller provider may not support certain devices or functions of devices manufactured by other vendors.

To overcome some of the problems inherent in the use of proprietary DCSs, the process control industry has developed a number of standard, open communication protocols including, for example, the HART®, PROFIBUS®, WORLDFIP®, LONWORKS®, Device-Net®, and CAN protocols, which enable field devices made by different manufacturers to be used together within the same process control network. In fact, any field device that conforms to one of these protocols can be used within a process to communicate with and to be controlled by a DCS controller or other controller that supports the protocol, even if that field device is made by a different manufacturer than the manufacturer of the DCS controller.

Moreover, there is now a move within the process control industry to decentralize process control and, thereby, simplify DCS controllers or eliminate the need for DCS controllers to a large extent. Decentralized control is obtained by having process control devices, such as valve positioners, transmitters, etc. perform one or more process control functions and by then communicating data across a bus structure for use by other process control devices in performing other control functions. To implement these control functions, each process control device includes a microprocessor capable of performing one or more control functions as well as communicating with other process control devices using a standard and open communication protocol. In this manner, field devices made by different manufacturers can be interconnected within a process control network to communicate with one another and to perform one or more process control functions forming a control loop without the intervention of a DCS controller. The all digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and communicate with one another via a standard bus to effect decentralized control within a process.

The bus includes different sections, or segments, which are separated by bridge devices, such as controllers. Each segment interconnects a subset of the devices attached to the bus to enable communications between the devices to control the process. The controllers communicate with the devices on the segments via input/output (I/O) devices. The I/O devices implement the communications protocol used in the process control network, and control the communications between the controllers and the devices on the segments. Although the I/O devices facilitate the communications between the controllers and the devices on the segments, process control ceases, at least with respect to the devices on a particular segment, if the I/O device for the segment goes out of service for whatever reason.

The impact of a disabled I/O device and disruption to process control may be reduced by providing a backup I/O device that is connected to the segment and that takes over for the disabled I/O device. However, the transition from the disabled I/O device to the backup I/O device is not seamless, and disruption in the process control still occurs. Currently known backup I/O devices are not updated with the current information stored in the primary I/O device, such as current values of process variables, functional software that may reside in the I/O device, the communication schedules for the devices on the segment, and the like. Also, in some implementations, the backup I/O device does not automatically assume control when the primary I/O device becomes disabled, resulting in a delay in performing process control until a user activates the backup I/O device. Moreover, in some communications protocols such as the Fieldbus protocol, the devices are configured to communicate specifically with the primary I/O device and must be reconfigured to communicate with the backup I/O device before the backup I/O device can take over communications on the segment. Therefore, a need exists for a redundant bus I/O device in process control networks that seamlessly and transparently takes over for the disabled primary I/O device without disrupting the implementation of process control in the process control network.

SUMMARY OF THE INVENTION

The present invention is directed to a method of and a device for implementing redundant devices in a process control network such as one having distributed control functions. The method and device of the present invention use a pair of redundant devices, such as redundant I/O devices, communicatively connected to a segment of the bus in parallel to each other and in series between the controller and field devices on the segment. The redundant devices are assigned a virtual publishing address, which may be the unique address of one of the redundant devices, that is used in communicating over the bus. At all times, one of the redundant devices is operating in an active mode and communicating with the devices in process control network, and the other redundant device is operating in a backup mode wherein the redundant device maintains a communication connection with the devices and listens for messages transmitted by the devices and intended for the redundant devices, but does not respond to messages from the other devices until the device switches to the active mode. Both redundant devices transmit messages over the bus using the virtual publishing address so that their messages are identical and will be received and processed by the field devices regardless of which redundant device is active. The redundant devices are configured to detect when the active device is, or is about to become, disabled, and the backup device automatically converts to the active mode and communicates with the controller and field devices.

By using the virtual publishing address in their communications, the redundant devices are viewed by the other devices as a single virtual device that communicates continuously even when one of the physical devices is taken out of service for whatever reason. Because both redundant devices transmit messages using the virtual publishing address, the field devices do not have to be reprogrammed to receive messages with the backup redundant device's address when the backup becomes the active redundant device, thereby reducing or eliminating the disruption to process control and communications when the active redundant device goes out of service.

According to one aspect of the present invention, each device, including the redundant devices, has a publishing buffer for storing massages to be transmitted on the bus, and a subscribing buffer for storing messages received from other devices. The redundant device operating in the backup mode receives in its subscribing buffer messages that published by the other devices and intended for the virtual device. Moreover, the backup redundant device receives messages transmitted by the active redundant device over the bus and stores these messages in its publishing buffer. By processing and storing the messages in this manner, the backup redundant device has the current information necessary to take over as the active redundant device immediately without user or system intervention to reprogram the backup redundant device with the current information.

In another aspect of the present invention, the redundant devices detect that they are part of a redundant pair based on their physical connections to the bus and to each other. In one alternative embodiment, the redundant devices are communicatively linked to each other via a direct communications link external to the bus. The redundant devices may exchange status information, process data, alarm messages, and the like, over the communications link. Alternatively, the redundant devices may be configured to detect the connection port or slot, or the configuration of the connection port or slot, to which the redundant devices are attached and thereby determine that they are one of a pair of redundant devices and that they are either the active or the backup redundant device. Configured in this way, disabled redundant devices can be replaced, with the replacement redundant device becoming operational as part of the virtual device without the necessity of reconfiguring the redundant device to operate as part of the redundant pair of redundant devices.

In a still further aspect of the present invention, the other devices in the system, such as a host device having a user interface and graphical display, may be configured to detect the configuration of the connection ports or slots for the redundant devices and the devices' connections thereto. Once detected, the host device can format the graphical display with information indicating the presence of the redundant devices, the operating mode of each of the redundant devices, the operational status of the redundant devices, and the like.

The features and advantages of the invention will be apparent to those of ordinary skill in the art in view of the detailed description of the preferred embodiment, which is made with reference to the drawings, a brief description of which is provided below.

DESCRIPTION OF THE PREFERRED EMBODIMENTS

Figure 1:
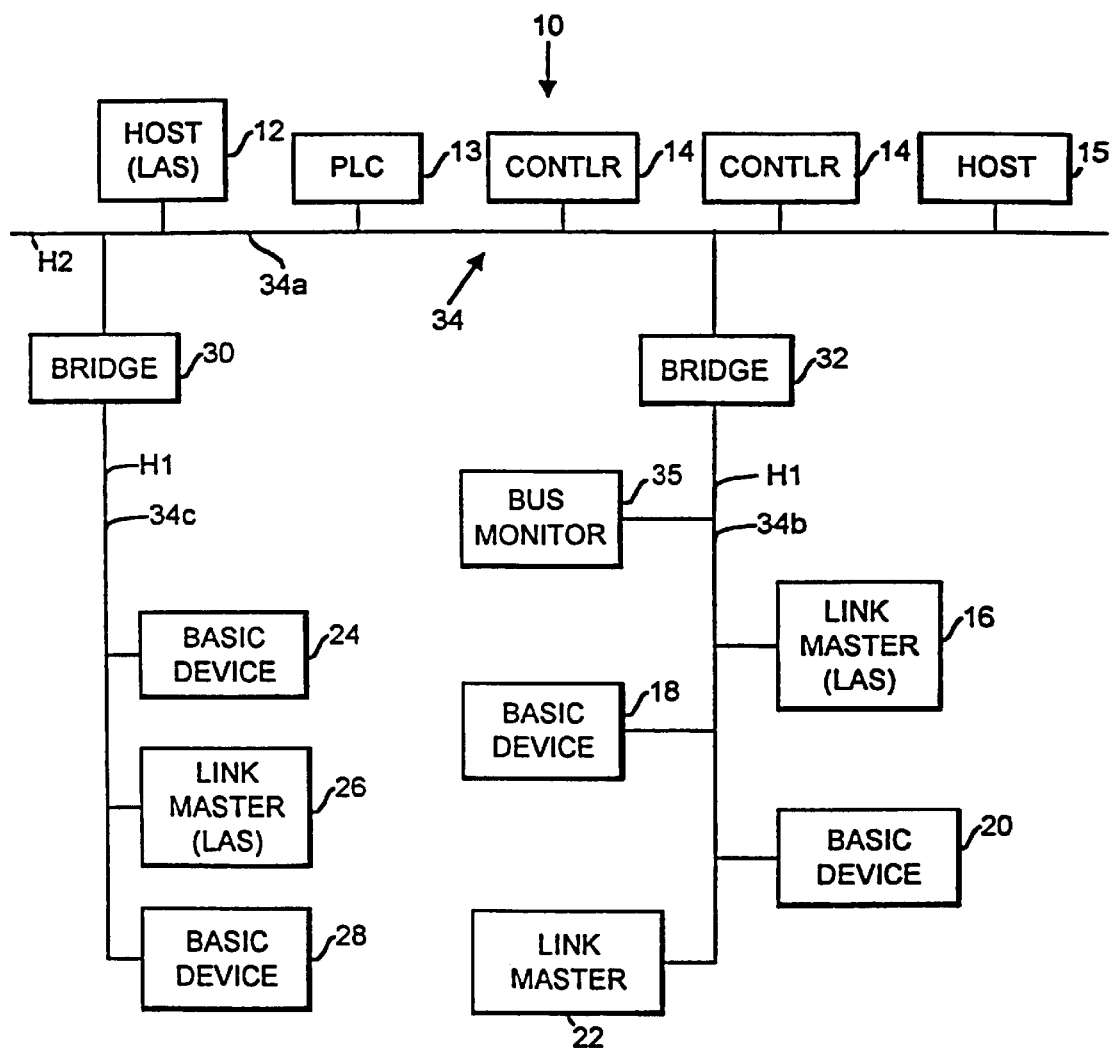
FIG. 1 is a schematic block diagram of a process control network using the Fieldbus protocol.

While the redundant devices of the present invention are described in detail in conjunction with a process control network that implements process control functions in a decentralized or distributed manner using a set of Fieldbus devices, it should be noted that the redundant devices of the present invention can be used with process control networks that perform distributed control functions using other types of field devices and communication protocols, including protocols that rely on other than two-wire buses and protocols that support only analog or both analog and digital communications. Thus, for example, the redundant devices of the present invention can be used in any process control network that performs distributed control functions even if this process control network uses the HART, PROFIBUS, etc. communication protocols or any other communication protocols that now exist or that may be developed in the future. Furthermore, the redundant devices of the present invention may also be used with standard process control networks that do not perform distributed control functions, such as HART networks, etc., and may be used with any desired process control device, including valves, positioners, transmitters, etc.

Before discussing the details of the redundant devices of the present invention, a general description of the Fieldbus protocol, field devices configured according to this protocol, and the way in which communication occurs in a process control network that uses the Fieldbus protocol will be provided. However, it should be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. In particular, the Fieldbus protocol, and the manner of communicating with and storing data in devices using the Fieldbus protocol, is described in detail in the manuals entitled Communications Technical Specification and User Layer Technical Specification from the Fieldbus Foundation, which are hereby expressly incorporated by reference herein in their entirety.

The Fieldbus protocol is an all-digital, serial, two-way communication protocol that provides a standardized physical interface to a two-wire loop or bus interconnecting "field" equipment such as sensors, actuators, controllers, valves, etc. located in an instrumentation or process control environment of, for example, a factory or a plant. The Fieldbus protocol provides, in effect, a local area network for field instruments (field devices) within a process facility, which enables these field devices to perform control functions at locations distributed throughout a process and to communicate with one another before and after the performance of these control functions to implement an overall control strategy. Because the Fieldbus protocol enables control functions to be distributed throughout a process control network, it reduces the complexity of, or entirely eliminates the necessity of the centralized process controller typically associated with a DCS.

Referring to FIG. 1, a process control network 10 using the Fieldbus protocol may include a host 12 connected to a number of other devices such as a program logic controller (PLC) 13, a number of controllers 14, another host device 15 and a set of field devices 16, 18, 20, 22, 24, 26, 28, 30, and 32 via a two-wire Fieldbus loop or bus 34. The network 10 may further include other devices, such as a bus monitor 35, that constantly listen to the bus 34 and accumulate communications and diagnostics information that is used to evaluate the performance of the network 10. The bus 34 includes different sections or segments, 34a, 34b, and 34c which are separated by bridge devices 30 and 32, which may be controllers. Each of the sections 34a, 34b, and 34c interconnects a subset of the devices attached to the bus 34 to enable communications between the devices in a manner described hereinafter. Of course, the network of FIG. 1 is illustrative only, there being many other ways in which a process control network may be configured using the Fieldbus protocol. Typically, a configurer is located in one of the devices, such as the host 12, and is responsible for setting up or configuring each of the devices (which are "smart" devices in that they each include a microprocessor capable of performing communication and, in some cases, control functions) as well as recognizing when new field devices are connected to the bus 34, when field devices are removed from the bus 34, receiving some of the data generated by the field devices 16–32, and interfacing with one or more user terminals, which may be located in the host 12 or in any other device connected to the host 12 in any manner.

The bus 34 supports or allows two-way, purely digital communication and may also provide a power signal to any or all of the devices connected thereto, such as the field devices 16–32. Alternatively, any or all of the devices 12–32 may have their own power supplies or may be connected to external power supplies via separate wires (not shown). While the devices 12–32 are illustrated in FIG. 1 as being connected to the bus 34 in a standard bus-type connection, in which multiple devices are connected to the same pair of wires making up the bus segments 34a, 34b, and 34c, the Fieldbus protocol allows other device/wire topologies including point-to-point connections, in which each device is connected to a controller or a host via a separate two-wire pair (similar to typical 4–20 mA analog DCS systems), and tree or "spur" connections in which each device is connected to a common point in a two-wire bus which may be, for example, a junction box or a termination area in one of the field devices within a process control network.

Data may be sent over the different bus segments 34a, 34b, and 34c at the same or different communication baud rates or speeds according to the Fieldbus protocol. For example, the Fieldbus protocol provides a 31.25 Kbit/s communication rate (H1), illustrated as being used by the bus segments 34b and 34c of FIG. 1, and higher communication rates (H2), which will be typically used for advanced process control, remote input/output, and high speed factory automation applications and is illustrated as being used by the bus segment 34a of FIG. 1. Likewise, data may be sent over the bus segments 34a, 34b, and 34c according to the Fieldbus protocol using voltage mode signaling or current mode signaling. Of course, the maximum length of each segment of the bus 34 is not strictly limited but is, instead, determined by the communication rate, cable type, wire size, bus power option, etc. of that section.

The Fieldbus protocol classifies the devices that can be connected to the bus 34 into three categories, namely, basic devices, link master devices, and bridge devices. Basic devices (such as devices 18, 20, 24, and 28 of FIG. 1) can communicate, that is, send and receive communication signals on or from the bus 34, but are not capable of controlling the order or timing of communication that occurs on the bus 34. Link master devices (such as devices 16, 22, and 26 as well as the host 12 of FIG. 1) are devices that communicate over the bus 34 and are capable of controlling the flow of and the timing of communication signals on the bus 34. Bridge devices (such as devices 30 and 32 of FIG. 1) are devices configured to communicate on and to interconnect individual segments or branches of a Fieldbus bus to create larger process control networks. If desired, bridge devices may convert between different data speeds and/or different data signaling formats used on the different segments of the bus 34, may amplify signals traveling between the segments of the bus 34, may filter the signals flowing between the different segments of the bus 34 and pass only those signals destined to be received by a device on one of the bus segments to which the bridge is coupled and/or may take other actions necessary to link different segments of the bus 34. Bridge devices that connect bus segments that operate at different speeds must have link master capabilities at the lower speed segment side of the bridge. The hosts 12 and 15, the PLC 13, and the controllers 14 may be any type of Fieldbus device but, typically, will be link master devices.

Each of the devices 12–32 is capable of communicating over the bus 34 and, and may be capable of independently performing one or more process control functions using data acquired by the device, from the process, or from a different device via communication signals on the bus 34. Fieldbus devices are, therefore, capable of directly implementing portions of an overall control strategy which, in the past, were performed by a centralized digital controller of a DCS. To perform control functions, each Fieldbus device includes one or more standardized "blocks" which are implemented in a microprocessor within the device. In particular, each Fieldbus device includes one resource block and may include zero or more function blocks, and zero or more transducer blocks. These blocks are referred to as block objects.

A resource block stores and communicates device specific data pertaining to some of the characteristics of a Fieldbus device including, for example, a device type, a device revision indication, and indications of where other device specific information may be obtained within a memory of the device. While different device manufacturers may store different types of data in the resource block of a field device, each field device conforming to the Fieldbus protocol includes a resource block that stores some data.

A function block defines and implements an input function, an output function, or a control function associated with the field device and, thus, function blocks are generally referred to as input, output, and control function blocks. However, other categories of function blocks such as hybrid function blocks may exist or may be developed in the future. Each input or output function block produces at least one process control input (such as a process variable from a process measurement device) or process control output (such as a valve position sent to an actuation device) while each control function block uses an algorithm (which may be proprietary in nature) to produce one or more process outputs from one or more process inputs and control inputs. Examples of standard function blocks include analog input (AI), analog output (AO), bias (B), control selector (CS), discrete input (DI), discrete output (DO), manual loader (ML), proportional/derivative (PD), proportional/integral/derivative (PID), ratio (RA), and signal selector (SS) function blocks. However, other types of function blocks exist and new types of function blocks may be defined or created to operate in the Fieldbus environment.

A transducer block couples the inputs and outputs of a function block to local hardware devices, such as sensors and device actuators, to enable function blocks to read the outputs of local sensors and to command local devices to perform one or more functions such as moving a valve member. Transducer blocks typically contain information that is necessary to interpret signals delivered by a local device and to properly control local hardware devices including, for example, information identifying the type of a local device, calibration information associated with a local device, etc. A single transducer block is typically associated with each input or output function block.

Most function blocks are capable of generating alarm or event indications based on predetermined criteria and are capable of operating differently in different modes. Generally speaking, function blocks may operate in an automatic mode, in which, for example, the algorithm of a function block operates automatically; an operator mode in which the input or output of, for example, a function block, is controlled manually; an out-of-service mode in which the block does not operate; a cascade mode in which the operation of the block is affected from (determined by) the output of a different block; and one or more remote modes in which a remote computer determines the mode of the block. However, other modes of operation exist in the Fieldbus protocol.

Importantly, each block is capable of communicating with other blocks in the same or different field devices over the Fieldbus bus 34 using standard message formats defined by the Fieldbus protocol. As a result, combinations of function blocks (in the same or different devices) may communicate with each other to produce one or more decentralized control loops. Thus, for example, a PID function block in one field device may be connected via the bus 34 to receive an output of an AI function block in a second field device, to deliver data to an AO function block in third field device, and to receive an output of the AO function block as feedback to create a process control loop separate and apart from any DCS controller. In this manner, combinations of function blocks move control functions out of a centralized DCS environment, which allows DCS multi-function controllers to perform supervisory or coordinating functions or to be eliminated altogether. Furthermore, function blocks provide a graphical, block-oriented structure for easy configuration of a process and enable the distribution of functions among field devices from different suppliers because these blocks use a consistent communication protocol.

While the block objects discussed herein are referred to as "function blocks" in the context of the Fieldbus protocol, it will be apparent to those of ordinary skill in the art that process control networks using other communication protocols will include process function modules analogous to the described function blocks. Thus, although the examples in the following disclosure focus on the Fieldbus protocol, the present invention has application in networks using other communication protocols and is not limited to process control networks using the Fieldbus protocol.

In addition to containing and implementing block objects, each field device includes one or more other objects including link objects, trend objects, alert objects, and view objects. Link objects define the links between the inputs and outputs of blocks (such as function blocks) both internal to the field device and across the Fieldbus bus 34.

Trend objects allow local trending of function block parameters for access by other devices such as the host 12 or controllers 14 of FIG. 1. Trend objects retain short-term historical data pertaining to some, for example, function block parameter and report this data to other devices or function blocks via the bus 34 in an asynchronous manner. Alert objects report alarms and events over the bus 34. These alarms or events may relate to any event that occurs within a device or one of the blocks of a device. View objects are predefined groupings of block parameters used in standard human/machine interfacing and may be sent to other devices for viewing from time to time.

Figure 2:
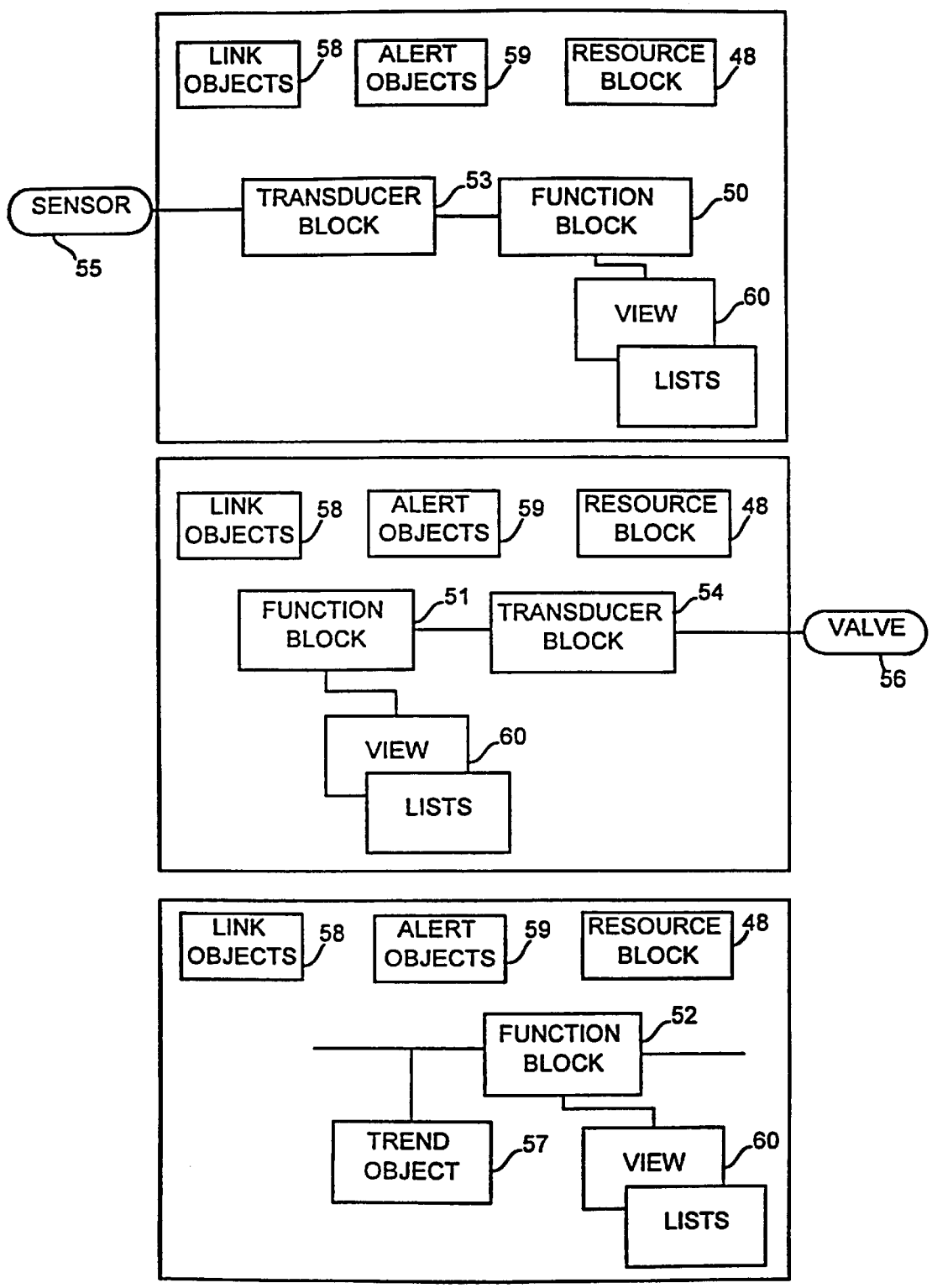
FIG. 2 is a schematic block diagram of a Fieldbus device having a set of three function blocks therein.

Referring now to FIG. 2, a Fieldbus device, which may be, for example, any of the field devices 16–28 of FIG. 1, is illustrated as including three resource blocks 48, three function blocks 50, 51, and 52 and two transducer blocks 53 and 54. One of the function blocks 50 (which may be an input function block) is coupled through the transducer block 53 to a sensor 55, which may be, for example, a temperature sensor, a set point indication sensor, etc. The second function block 51 (which may be an output function block) is coupled through the transducer block 54 to an output device such as a valve 56. The third function block 52 (which may be a control function block) has a trend object 57 associated therewith for trending the input parameter of the function block 52.

Link objects 58 define the block parameters of each of the associated blocks and alert objects 59 provide alarms or event notifications for the each of the associated blocks. View objects 60 are associated with each of the function blocks 50, 51, and 52 and include or group data lists for the function blocks with which they are associated. These lists contain information necessary for each of a set of different defined views. Of course, FIG. 2 is merely exemplary and other numbers of and types of block objects, link objects, alert objects, trend objects, and view objects maybe provided in any field device.

Figure 3:
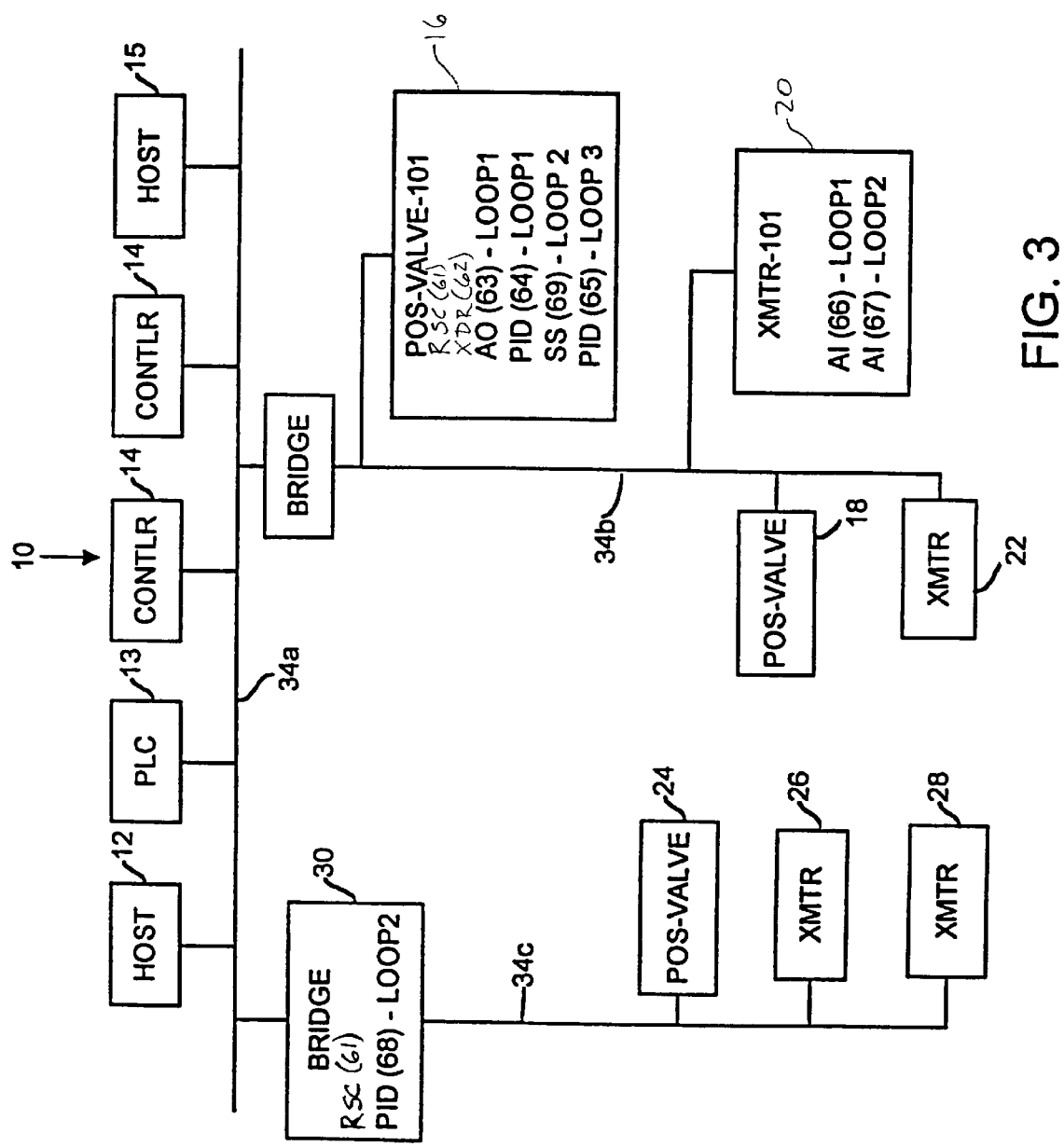
FIG. 3 is a schematic block diagram illustrating the function blocks within some of the devices of the process control network of FIG. 1.

Referring now to FIG. 3, a block diagram of the process control network 10 depicting the devices 16, 18, and 24 as positioner/valve devices and the devices 20, 22, 26, and 28 as transmitters also illustrates the function blocks associated with the positioner/valve 16, the transmitter 20, and the bridge 30. As illustrated in FIG. 3, the positioner/valve 16 includes a resource (RSC) block 61, a transducer (XDR) block 62, and a number of function blocks including an analog output (AO) function block 63, two PID function blocks 64 and 65, and a signal select (SS) function block 69. The transmitter 20 includes a resource block 61, two transducer blocks 62, and two analog input (AI) function blocks 66 and 67. Also, the bridge 30 includes a resource block 61 and a PID function block 68.

As will be understood, the different function blocks of FIG. 3 may operate together (by communicating over the bus 34) in a number of control loops and the control loops in which the function blocks of the positioner/valve 16, the transmitter 20, and the bridge 30 are located are identified in FIG. 3 by a loop identification block connected to each of these function blocks. Thus, as illustrated in FIG. 3, the AO function block 63 and the PID function block 64 of the positioner/valve 16 and the AI function block 66 of the transmitter 20 are connected within a control loop indicated as LOOP1, while the SS function block 69 of the positioner/valve 16, the AI function block 67 of the transmitter 20, and the PID function block 68 of the bridge 30 are connected in a control loop indicated as LOOP2. The other PID function block 65 of the positioner/valve 16 is connected within a control loop indicated as LOOP3.

Figure 4:
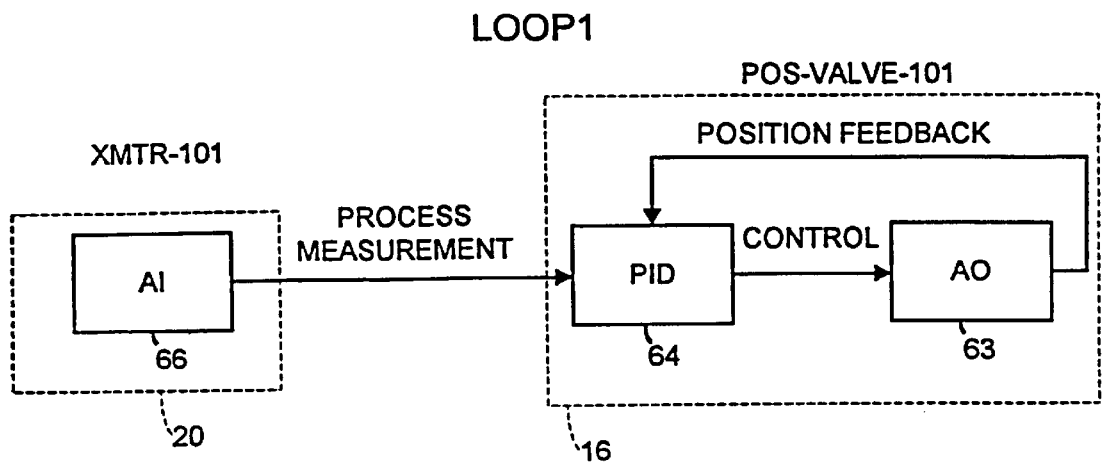
FIG. 4 is a control loop schematic for a typical process control loop within the process control network of FIG. 1.

The interconnected function blocks making up the control loop indicated as LOOP1 in FIG. 3 are illustrated in more detail in the schematic of this control loop depicted in FIG. 4. As can be seen from FIG. 4, the control loop LOOP1 is completely formed by communication links between the AO function block 63 and the PID function block 64 of the positioner/valve 16 and the AI function block 66 of the transmitter 20 (FIG. 3). The control loop diagram of FIG. 4 illustrates the communication interconnections between these function blocks using lines attaching the process and control inputs and outputs of these functions blocks. Thus, the output of the AI function block 66, which may comprise a process measurement or process parameter signal, is communicatively coupled via the bus segment 34b to the input of the PID function block 64 which has an output comprising a control signal communicatively coupled to an input of the AO function block 63. An output of the AO function block 63, which comprises a feedback signal indicating, for example, the position of the valve 16, is connected to a control input of the PID function block 64. The PID function block 64 uses this feedback signal along with the process measurement signal from the AI function block 66 to implement proper control of the AO function block 63. Of course the connections indicated by the lines in the control loop diagram of FIG. 4 may be performed internally within a field device when, as with the case of the AO and the PID function blocks 63 and 64, the function blocks are within the same field device (e.g., the positioner/valve 16), or these connections may be implemented over the two-wire communication bus 34 using standard Fieldbus synchronous communications. Of course, other control loops are implemented by other function blocks that are communicatively interconnected in other configurations.

To implement and perform communication and control activities, the Fieldbus protocol uses three general categories of technology identified as a physical layer, a communication "stack," and a user layer. The user layer includes the control and configuration functions provided in the form of blocks (such as function blocks) and objects within any particular process control device or field device. The user layer is typically designed in a proprietary manner by the device manufacturer but must be capable of receiving and sending messages according to the standard message format defined by the Fieldbus protocol and of being configured by a user in standard manners. The physical layer and the communication stack are necessary to effect communication between different blocks of different field devices in a standardized manner using the two-wire bus 34 and may be modeled by the well-known Open Systems Interconnect (OSI) layered communication model.

The physical layer, which corresponds to OSI layer 1, is embedded in each field device and the bus 34 and operates to convert electromagnetic signals received from the Fieldbus transmission medium (the two-wire bus 34) into messages capable of being used by the communication stack of the field device. The physical layer may be thought of as the bus 34 and the electromagnetic signals present on the bus 34 at the inputs and outputs of the field devices.

The communication stack, which is present in each Fieldbus device, includes a data link layer, which corresponds to OSI layer 2, a Fieldbus access sublayer, and a Fieldbus message specification layer, which corresponds to OSI layer 7. There is no corresponding structure for OSI layers 3–6 in the Fieldbus protocol. Each layer in the communication stack is responsible for encoding or decoding a portion of the message or signal that is transmitted on the Fieldbus bus 34. As a result, each layer of the communication stack adds or removes certain portions of the Fieldbus signal such as preambles, start delimiters, and end delimiters and, in some cases, decodes the stripped portions of the Fieldbus signal to identify where the rest of the signal or message should be sent or if the signal should be discarded because, for example, it contains a message or data for function blocks that are not within the receiving field device.

The data link/physical layer controls transmission of messages onto the bus 34 and manages access to the bus 34 according to a deterministic centralized bus scheduler called a link active scheduler, to be described in more detail below. The data link/physical layer removes a preamble from the signals on the transmission medium and may use the received preamble to synchronize the internal clock of the field device with the incoming Fieldbus signal. Likewise, the data link/physical layer converts messages on the communication stack into physical Fieldbus signals and encodes these signals with clock information to produce a "synchronous serial" signal having a proper preamble for transmission on the two-wire bus 34. During the decoding process, the data link/physical layer recognizes special codes within the preamble, such as start delimiters and end delimiters, to identify the beginning and the end of a particular Fieldbus message and may perform a checksum to verify the integrity of the signal or message received from the bus 34. Likewise, the data link/physical layer transmits Fieldbus signals on the bus 34 by adding start and end delimiters to messages on the communication stack and placing these signals on the transmission medium at the appropriate time.

The Fieldbus message specification layer allows the user layer (i.e., the function blocks, objects, etc. of a field device) to communicate across the bus 34 using a standard set of message formats and describes the communication services, message formats, and protocol behaviors required to build messages to be placed onto the communication stack and to be provided to the user layer. Because the Fieldbus message specification layer supplies standardized communications for the user layer, specific Fieldbus message specification communication services are defined for each type of object described above. For example, the Fieldbus message specification layer includes object dictionary services which allows a user to read an object dictionary of a device. The object dictionary stores object descriptions that describe or identify each of the objects (such as block objects) of a device. The Fieldbus message specification layer also provides context management services which allows a user to read and change communication relationships, known as virtual communication relationships (VCRs) described hereinafter, associated with one or more objects of a device. Still further, the Fieldbus message specification layer provides variable access services, event services, upload and download services, and program invocation services, all of which are well known in the Fieldbus protocol and, therefore, will not be described in more detail herein. The Fieldbus access sublayer maps the Fieldbus message specification layer into the data link layer.

To allow or enable operation of these layers, each Fieldbus device includes a management information base (MIB), which is a database that stores VCRs, dynamic variables, statistics, link active scheduler timing schedules, function block execution timing schedules and device tag and address information. Of course, the information within the MIB may be accessed or changed at any time using standard Fieldbus messages or commands. Furthermore, a device description is usually provided with each device to give a user or a host an extended view of the information in the VFD. A device description, which must typically be tokenized to be used by a host, stores information needed for the host to understand the meaning of the data in the VFDs of a device.

As will be understood, to implement any control strategy using function blocks distributed throughout a process control network, the execution of the function blocks must be precisely scheduled with respect to the execution of other function blocks in a particular control loop. Likewise, communication between different function blocks must be precisely scheduled on the bus 34 so that the proper data is provided to each function block before that block executes.

The way in which different field devices (and different blocks within field devices) communicate over the Fieldbus transmission medium will now be described with respect to FIG. 1. For communication to occur, one of the link master devices on each segment of the bus 34 (for example, devices 12, 16, and 26) operates as a link active scheduler (LAS) that actively schedules and controls communication on the associated segment of the bus 34. The LAS for each segment of the bus 34 stores and updates a communication schedule (a link active schedule) containing the times that each function block of each device is scheduled to start periodic communication activity on the bus 34 and the length of time for which this communication activity is to occur. While there may be one and only one active LAS device on each segment of the bus 34, other link master devices (such as the device 22 on the segment 34*b*) may serve as backup LASs and become active when, for example, the current LAS fails. Basic devices do not have the capability to become an LAS at any time.

Generally speaking, communication activities over the bus 34 are divided into repeating macrocycles, each of which includes one synchronous communication for each bus publishing function block active on any particular segment of the bus 34 and one or more asynchronous communications for one or more of the functions blocks or devices active on a segment of the bus 34. A device may be active, i.e., send data to and receive data from any segment of the bus 34, even if it is physically connected to a different segment of the bus 34, through coordinated operation of the bridges and the LASs on the bus 34.

During each macrocycle, each of the function blocks active on a particular segment of the bus 34 executes, usually at a different, but precisely scheduled (synchronous) time and, at another precisely scheduled time, publishes its output data on that segment of the bus 34 in response to a compel data command generated by the appropriate LAS. Preferably, each function block is scheduled to publish its output data shortly after the end of the execution period of the function block. Furthermore, the data publishing times of the different function blocks are scheduled serially so that no two function blocks on a particular segment of the bus 34 publish data at the same time. During the time that synchronous communication is not occurring, each field device is allowed, in turn, to transmit alarm data, view data, etc. in an asynchronous manner using token driven communications. As noted above, the times for sending the compel data commands to each of the devices on a segment of the bus 34 are stored in the MIB of the LAS device for that segment. These times are typically stored as offset times because they identify the times at which a function block is to execute or send data as an offset from the beginning of an "absolute link schedule start time," which is known by all of the devices connected to the bus 34.

To effect communications during each macrocycle, the LAS, for example, the LAS 16 of the bus segment 34*b*, sends a compel data command to each of the devices on the bus segment 34*b* according to the list of transmit times stored in the link active schedule. Upon receiving a compel data command, a function block of a device publishes its output data on the bus 34 for a specific amount of time. Because each of the functions blocks is typically scheduled to execute so that execution of that block is completed shortly before the block is scheduled to receive a compel data command, the data published in response to a compel data command should be the most recent output data of the function block. However, if a function block is executing slowly and has not latched new outputs when it receives the compel data command, the function block publishes the output data generated during the last run of the function block and indicates that the published data is old data.

After the LAS has sent a compel data command to each of the function blocks on particular segment of the bus 34 and during the times that function blocks are executing, the LAS may cause asynchronous communication activities to occur. To effect asynchronous communication, the LAS sends a pass token message to a particular field device. When a field device receives a pass token message, that field device has full access to the bus 34 (or a segment thereof) and can send asynchronous messages, such as alarm messages, trend data, operator set point changes, etc. until the messages are complete or until a maximum allotted "token hold time" has expired. Thereafter the field device releases the bus 34 (or any particular segment thereof) and the LAS sends a pass token message to another device. This process repeats until the end of the macrocycle or until the LAS is scheduled to send a compel data command to effect synchronous communication. Of course, depending on the amount of message traffic and the number of devices and blocks coupled to any particular segment of the bus 34, not every device may receive a pass token message during each macrocycle.

Figure 5:
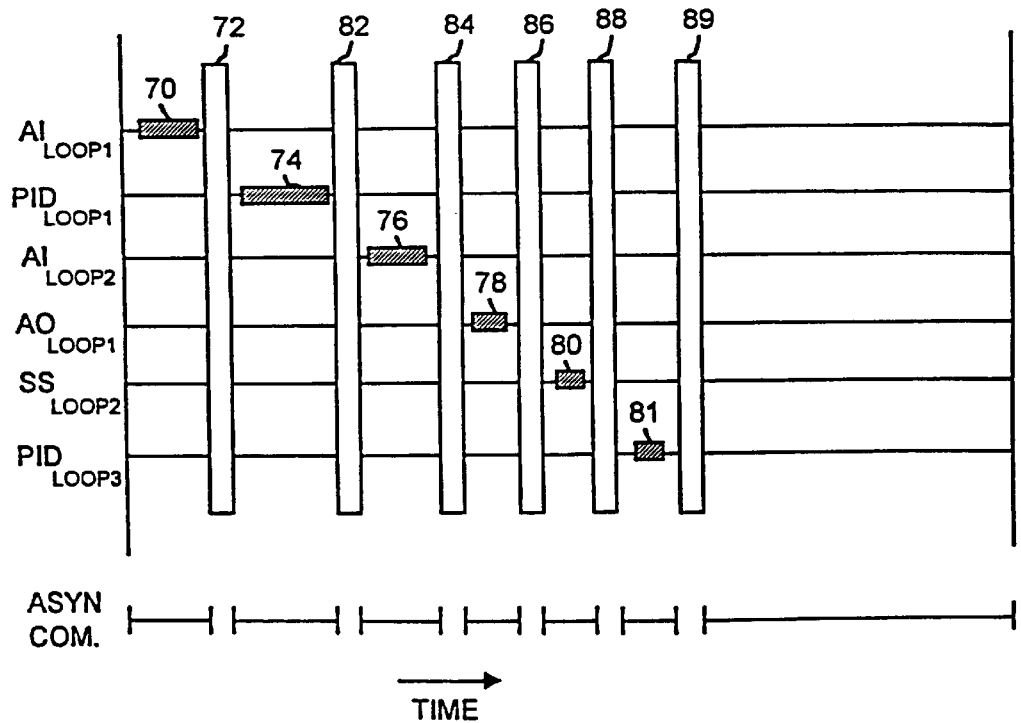
FIG. 5 is a timing schematic for a macrocycle of a segment of the bus of the process control network of FIG. 1.

FIG. 5 illustrates a timing schematic depicting the times at which function blocks on the bus segment 34*b* of FIG. 1 execute during each macrocycle of the bus segment 34b and the times at which synchronous communications occur during each macrocycle associated with the bus segment 34b. In the timing schedule of FIG. 5, time is indicated on the horizontal axis and activities associated with the different function blocks of the positioner/valve 16 and the transmitter 20 (of FIG. 3) are illustrated on the vertical axis. The control loop in which each of the functions blocks operates is identified in FIG. 5 as a subscript designation. Thus $AI_{Loop1}$ refers to the AI function block 66 of the transmitter 20, $PID_{LOOP1}$ refers to the PID function block 64 of the positioner/valve 16, etc. The block execution period of each of the illustrated function blocks is depicted by a cross-hatched box while each scheduled synchronous communication is identified by a vertical bar in FIG. 5.

Thus, according to the timing schedule of FIG. 5, during any particular macrocycle of the segment 34b (FIG. 1), the $AI_{Loop1}$ function block executes first for the time period specified by the box 70. Then, during the time period indicated by the vertical bar 72, the output of the $AI_{Loop1}$ function block is published on the bus segment 34b in response to a compel data command from the LAS for the bus segment 34b. Likewise, the boxes 74, 76, 78, 80, and 81 indicate the execution times of the function blocks $PID_{LOOP1}$, $AI_{LOOP2}$, $AO_{LOOP1}$, $SS_{LOOP2}$, and $PID_{LOOP3}$, respectively (which are different for each of the different blocks), while the vertical bars 82, 84, 86, 88, and 89 indicate the times that the function blocks $PID_{LOOP1}$, $AI_{LOOP2}$, $AO_{LOOP1}$, $SS_{LOOP2}$, and $PID_{LOOP3}$, respectively, publish data on the bus segment 34b.

As will be apparent, the timing schematic of FIG. 5 also illustrates the times available for asynchronous communication activities, which may occur during the execution times of any of the function blocks and during the time at the end of the macrocycle during which no function blocks are executing and when no synchronous communication is taking place on the bus segment 34b. Of course, if desired, different function blocks can be intentionally scheduled to execute at the same time and not all function blocks must publish data on the bus if, for example, no other device subscribes to the data produced by a function block.

Field devices are able to communicate with each other over the bus 34 using unique addresses that are assigned to each field device. The field devices are attached to nodes of the bus 34, and each node has a designated physical address that identifies the field device attached thereto for use in communicating with the other field devices in the process control network. The unique address for the field device is stored in the MIB of the field device, and the address is included in the messages published by the device on the bus. The field device or devices to which the messages are published are configured with VCRs instructing the device (s) to listen to the bus segment 34 for messages containing the address of the publishing field device. When the subscribing field devices detect messages with the address of the publishing field device, they decode and process the messages as necessary to effect process control.

Field devices are able to publish or transmit data and messages over the bus 34 using one of three types of VCRs defined in the Fieldbus access sublayer of the stack of each field device. A client/server VCR is used for queued, unscheduled, user initiated, one to one, communications between devices on the bus 34. Such queued messages are sent and received in the order submitted for transmission, according to their priority, without overwriting previous messages. Thus, a field device may use a client/server VCR when it receives a pass token message from an LAS to send a request message to another device on the bus 34. The requester is called the "client" and the device that receives the request is called the "server." The server sends a response when it receives a pass token message from the LAS. The client/server VCR is used, for example, to effect operator initiated requests such as set point changes, tuning parameter access and changes, alarm acknowledgments, and device uploads and downloads.

A report distribution VCR is used for queued, unscheduled, user initiated, one to many communications. For example, when a field device with an event or a trend report receives a pass token from an LAS, that field device sends its message to a "group address" defined in the Fieldbus access sublayer of the communication stack of that device. Devices that are configured to listen on that VCR will receive the report. The report distribution VCR type is typically used by Fieldbus devices to send alarm notifications to operator consoles.

A publisher/subscriber VCR type is used for buffered, one to many communications. Buffered communications are ones that store and send only the latest version of the data and, thus, new data completely overwrites previous data. Function block outputs, for example, comprise buffered data. A "publisher" field device publishes or broadcasts a message using the publisher/subscriber VCR type to all of the "subscriber" field devices on the bus 34 when the publisher device receives a compel data message from the LAS or from a subscriber device. The publisher/subscriber relationships are predetermined and are defined and stored within the Fieldbus access sublayer of the communication stack of each field device.

To assure proper communication activities over the bus 34, each LAS periodically sends a time distribution message to all of the field devices connected to a segment of the bus 34, which enables the receiving devices to adjust their local application time to be in synchronization with one another. Between these synchronization messages, clock time is independently maintained in each device based on its own internal clock. Clock synchronization allows the field devices to time stamp data throughout the Fieldbus network to indicate, for example, when data was generated.

Furthermore, each LAS (and other link master device) on each bus segment stores a "live list," which is a list of all the devices that are connected to that segment of the bus 34, i.e., all of the devices that are properly responding to a pass token message. The LAS continually recognizes new devices added to a bus segment by periodically sending probe node messages to addresses that are not on the live list. In fact, each LAS is required to probe at least one address after it has completed a cycle of sending pass token messages to all of the field devices in the live list. If a field device is present at the probed address and receives the probe node message, the device immediately returns a probe response message. Upon receiving a probe response message, the LAS adds the device to the live list and confirms by sending a node activation message to the probed field device. A field device remains on the live list as long as that field device responds properly to pass token messages. However, an LAS removes a field device from the live list if the field device does not, after three successive tries, either use the token or immediately return the token to the LAS. When a field device is added to or removed from the live list, the LAS broadcasts changes in the live list to all the other link master devices on the appropriate segment of the bus 34 to allow each link master device to maintain a current copy of the live list.

Referring back to FIG. 1, as previously discussed, the bridge devices 30 and 32 may be controllers that implement process control schemes or routines having a number of different loops or segments therein. Generally speaking, each control loop controls one or more field devices to control some part of a process. In order to effect process control, and to exchange other information related to the operation and status of the controlled process, the controllers and the field devices on a segment of the bus transmit messages back and forth on the segment. The communications between the controllers and the field devices are facilitated by I/O devices connected to the segment between the controller and the field devices. The MIB of an I/O device is programmed with VCRs indicating that the I/O device is to receive the messages from the controller and the devices and pass the messages along the segment to the appropriate controller or device(s). Additionally, the I/O device may act as the LAS for the segment and transmit messages on the bus that schedule and control communications on the segment. Moreover, the I/O device may include function blocks that perform process control functions. In the latter capacities, the I/O device itself may transmit messages on the bus address to subscribing field devices that detect the messages and decode and process the information contained therein.

Because the I/O device on a segment connects the controller to the field devices, a failure of the I/O device disrupts both the communications on the segment and the execution of process control until the I/O device is repaired or replaced. One alternative for minimizing the disruption to process control is to install on the segment a backup I/O device that is enabled when the primary I/O device becomes disabled. The pre-installed backup I/O device reduces the disruption by eliminating the necessity of either repairing the I/O device or removing the disabled I/O device and replacing it with a new I/O device. However, although the disruption is reduced, process control is still interrupted for a period of time due to several factors inherent in the process control network. For instance, the failure of the I/O device must be detected and the user notified so that the backup I/O device may be activated. Additionally, once activated, the backup I/O device must be reprogrammed with the current data from the disable I/O device, such as process variables, VCRs, the link active schedule if the I/O device is an LAS, and the like. Moreover, the backup I/O device is assigned its own unique address on the bus and, therefor, the controller and the field devices must be reprogrammed to listen to the bus for messages containing the address of the backup I/O device instead of the address of the primary I/O device. All of this activity takes time during which normal operation of control loops is suspended. For these reasons, a need exists for redundant bus I/O devices wherein the backup I/O device is constantly updated with the data currently stored in the active I/O device, the backup I/O device automatically becomes the active I/O device when the primary I/O device is disabled, and the transition from the primary I/O device to the backup I/O device is transparent to the controller and field devices connected to the segment of the bus.

Figure 6:
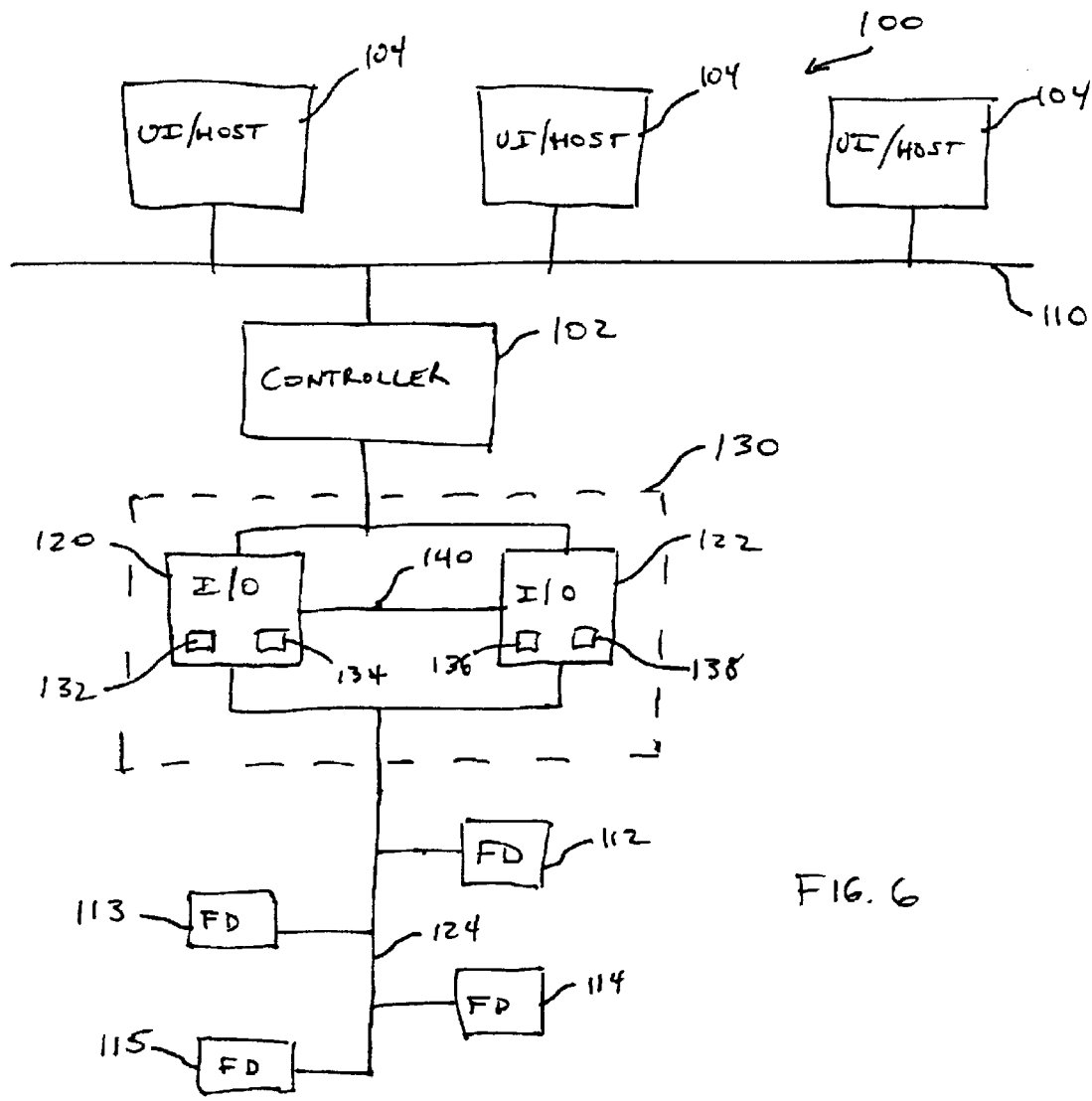
FIG. 6 is a schematic functional block diagram of a process control network incorporating redundant bus I/O devices.

Referring now to FIG. 6, a process control network 100 in which redundant bus I/O devices could be implemented is illustrated. The process control network 100, which may be, for example, a DeltaV process control system sold by Fisher-Rosemount Systems, Inc. of Austin, Tex., includes one or more controllers 102, one or more host or operator workstations 104, and/or other computer devices such as other workstations, databases, configuration stations, etc. connected to a bus 110 which maybe, for example, an Ethernet bus. As is known, the controller(s) 102 and workstations 104 include processors that implement software stored in memories of those devices. The controller 102 may be, for example, a distributed control system controller or any other type of controller implemented in, for example, a personal computer or other device that allows a user or an operator to interface with the process control system 100 in any known manner.

Numerous field devices 112–115 are illustrated as being connected to the controller 102 via redundant I/O devices 120 and 122 that will be described more fully herein. The devices 112–115 are illustrated as being connected to a bus segment 124 which may be any desired type of bus, such as a Fieldbus link. In this case, the devices 112–115 may use the Foundation Fieldbus communication protocol. Of course, each of the field devices 112–115 may be any type of field device used in the process control network 100 including, for example, sensors, control valves, positioners, fans, video cameras, microphones, etc. Of course, other devices may be connected to the network 100 in any desired manner.

As illustrated in FIG. 6, the redundant I/O devices 120 and 122 are connected in parallel on the segment 124 between the controller 102 and the field devices 112–115. For purposes of the following discussion, the I/O device 120 will also be referred to as the primary I/O device 120, and the I/O device 122 will also be referred to as the secondary I/O device 122. As previously discussed, each I/O device 120 and 122 has a unique address based on the node to which the device is connected. The controller 102 and field devices 112–115 identify messages from the I/O devices 120 and 122 based on the presence of the address in the messages transmitted on the bus segment 124. In order to implement redundancy, the I/O devices 120 and 122 are configured to operate as a single virtual I/O device 130 communicating with controller 102 and field devices 112–115 in the same manner regardless of which of the I/O devices 120 and 122 is active and communicating on the bus segment 124. The I/O devices 120 and 122, whichever device is currently the active I/O device of the virtual I/O device 130, communicate transparently with the controller 102, the field devices 112–115 and the other devices of the network 100 by publishing messages having the same address (a virtual publishing address). By publishing messages using the virtual publishing address, all virtual I/O device 130 messages appear the same and are processed the same way by the controller 102 and field devices 112–115 regardless of which I/O device 120 and 122 actually published the message.

The virtual publishing address for the virtual I/O device 130 may be the unique physical address for one of the I/O devices 120 or 122 or any other unique address that is assigned to the virtual I/O device 130. Regardless of the value of the virtual publishing address or the manner in which the virtual publishing address is assigned, the virtual publishing address and the code for implementing the virtual I/O device 130 is stored in the communication stack of the I/O devices 120 and 122. Additionally, the publisher VCRs in the controller 102 and the field devices 112–115 are configured with the virtual publishing address for the virtual I/O device 130 instead of the address of either I/O device 120 or 122.

During normal operation of the process control network 100, one of the I/O devices 120 and 122 is actively sending and receiving messages on the bus segment 124, operating as the LAS for the bus segment 124, performing process control functions, and the like, that are to be performed by the virtual I/O device 130 to effect process control in the process control network 100. For the purposes of the following discussion, the I/O device 120, which has previously been identified as the primary I/O device 120, is initially the active I/O device for the virtual I/O device 130. The I/O device that is not acting as the active I/O device for the virtual I/O device 130, in this case the secondary I/O device 122, is considered to be the backup I/O device for the virtual I/O device 130. While in the backup mode, the backup I/O device 122 does not perform any of the process control or communication functions of the virtual I/O device 130. However, the backup I/O device 122 is configured with the VCRs for the virtual I/O device 130 and listens to the bus segment 124 for messages transmitted on the bus segment 124 that are intended for the virtual I/O device 130. The backup I/O device 122 receives and decodes the messages, and stores any information from the messages that would normally be stored by the active I/O device 120. The backup I/O device 122 may even process information and update data stored therein, receive and store updated link active schedules, and execute any other functions that are necessary for the backup I/O device 122 to take over the process control functions of the virtual I/O device 130 if the active I/O device 120 becomes disabled or is otherwise taken out of service. As a result, even though the backup I/O device 122 ceases publishing messages while in the backup mode, the backup I/O device 122 maintains a communications connection with the function block application processes for the devices on the bus for communications integrity verification and to eliminate connection establishment delays while switching over to the active mode.

In addition to receiving and processing messages transmitted by the field devices 112–115 to the virtual I/O device 130, the backup I/O device 122 also receives and stores the messages published by the active I/O device 120 to the other devices on the bus 110 in order to take over as the active I/O device of the virtual I/O device 130. This functionality is implemented by programming the communication stacks of the I/O devices 120 and 122 for the backup I/O device 122 to listen for messages published by the active I/O device 120. Each device communicating on the bus 110 has both a publishing buffer for compiling and storing the messages that are to be communicated by the device on the bus 110, and a subscribing buffer for storing messages that are received from other devices in the process control network 100. For example, the primary I/O device 120 has a publishing buffer 132 and a subscribing buffer 134, and the secondary I/O device 122 has a publishing buffer 136 and subscribing buffer 138. In previously known devices, the publishing buffer only stores messages transmitted by the device and does not receive messages that have been transmitted to the device, and the subscribing buffer only stores messages transmitted to the device and not messages to be transmitted by the device. However, in order to implement the redundant I/O devices and have the backup I/O device take over for the active backup device with minimal or no disruption to process control, the publishing buffer of the backup I/O device 122 preferably receives and stores the most recently published message from the publishing buffer of the active I/O device 120.

The backup I/O device 122 is able to receive and store messages published by the active I/O device 120 by configuring the communication stack of the redundant I/O devices to have the publishing buffer of the backup I/O devices 122 function as a subscribing buffer for messages published from the publishing buffer of the active I/O device 120. While in the backup mode, the publishing buffer of the backup I/O device 122 ceases performing the normal functions of a publishing buffer, such as responding to compel data requests and connection establishment messages. At the same time, the backup I/O device listens to the bus segment 124 for published messages having the virtual publishing address for the virtual I/O device 130. When a message published by the active I/O device 120 is detected, the backup I/O device 122 decodes the message and stores the message in its publishing buffer instead of its subscribing buffer. When the backup I/O device 122 takes over as the active I/O device, the publishing buffer of the newly active I/O device has the most recent data from the publishing buffer of the disabled I/O device and is ready to takeover for the disabled I/O device immediately without intervention from a user or controlling device to update the data in the newly active I/O device. Once the I/O device converts from backup mode to active mode, the I/O device discontinues listening for messages containing the virtual publishing address for the virtual I/O device 130 and resumes the normal state activities such as responding to compel data commands and connection establishment messages.

In addition to being connected via the bus segment 124, the I/O devices 120 and 122 may also have a direct communication link 140 through which the I/O devices 120 and 122 communicate with each other in a manner that is not necessarily dictated by the communication protocol implemented on the bus segment 124. The communication link 140 may be any standard connection between the I/O devices 120 and 122 over which the devices may communicate, such as the physical connection between the I/O devices 120 and 122 to the backbone of the bus, a direct hardwire connection between the devices 120 and 122, and the like. The I/O devices 120 and 122 may exchange any type of information that is necessary for the devices to function as redundant I/O devices and thereby implement the virtual I/O device 130 as described above. The information may include communications regarding which of the I/O devices 120 and 122 is the primary I/O device and which is the secondary I/O device, which device is the active device and which is the backup device, and updated information from the active I/O device that is necessary for the backup I/O device to take over as the active I/O device. The I/O devices may also exchange status information indicating that the active I/O device is, or is about to become disabled. Additionally, the I/O devices 120 and 122 may have function blocks that are used to implement process control, and the I/O devices 120 and 122 may exchange information for use by the function blocks to effect process control.

When the I/O devices 120 and 122 are installed in the process control network 100, the I/O devices 120 and 122 must know that they are a pair of redundant I/O devices, that one of the I/O devices 120 and 122 is the primary I/O device and the other is the secondary I/O device, and that one of the I/O devices 120 and 122 is the active I/O device and the other is the backup I/O device. One method for establishing the relationship between the I/O devices 120 and 122 is to exchange information between the I/O devices 120 and 122 via the communication link 140 described above. Another way to establish the relationship between the I/O devices 120 and 122 is for a user to program the I/O devices 120 and 122 directly, or to execute a programming routine at a host device or operator work station 104 that causes the programming of the I/O devices 120 and 122 via messages transmitted over the bus 110. Alternatively, the relationships between the I/O devices 120 and 122 and the other devices in the process control network 100 can be determined by the physical configuration of the devices and/or by the manner in which the I/O devices 120 and 122 are connected to the process control network 100.

Figure 7:
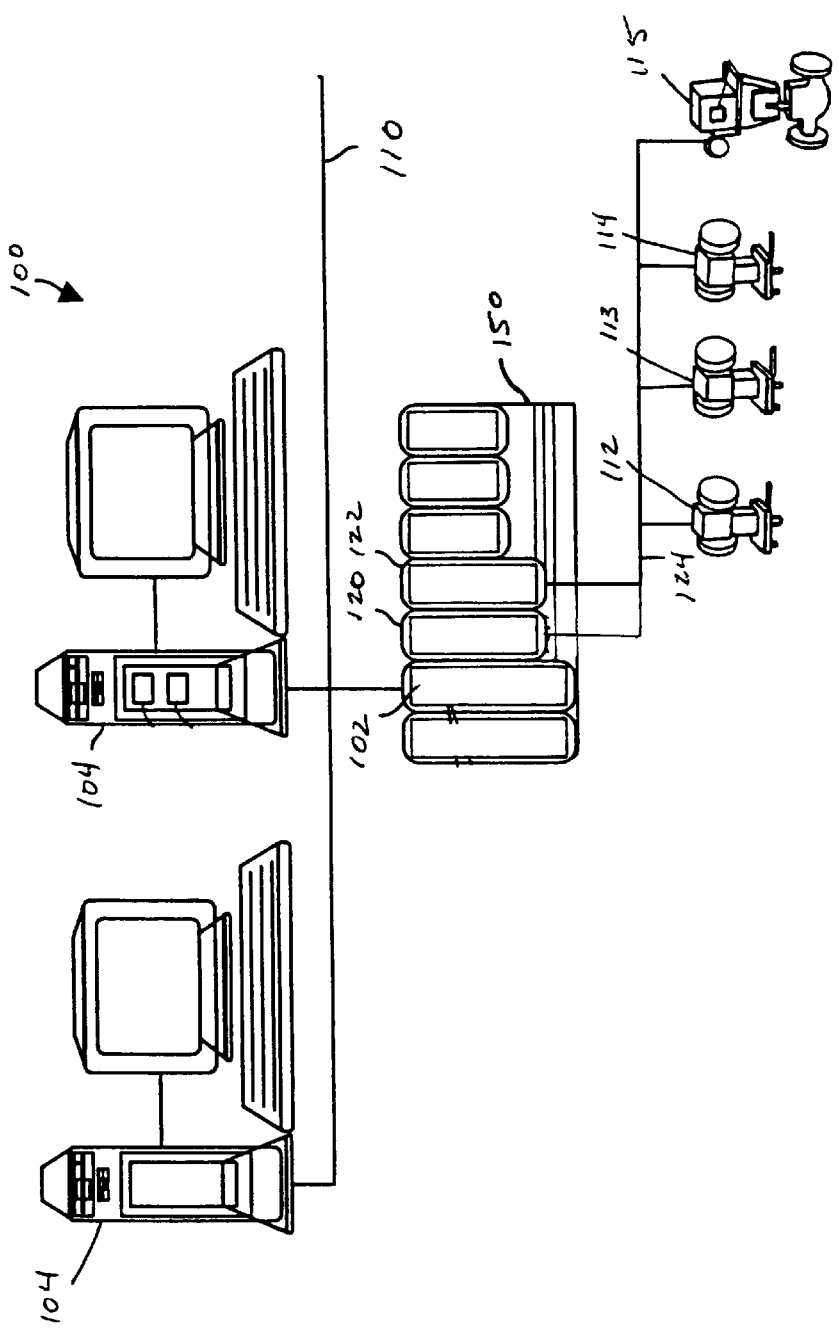
FIG. 7 is a schematic block diagram of the process control network of FIG. 6.

Referring now to FIG. 7, the physical configuration of the process control network 100 of FIG. 6 is illustrated. The controller 102, I/O devices 120 and 122, and other devices are connected to the bus segment 124 via a backplane 150 having a plurality of ports or slots with pin connections. The devices are connected to the slots of the backplane and the backplane is configured so that the devices are properly connected to the bus segment 134. For example, to implement the process control network 100 of FIG. 6, the backplane is configured so that the slot to which the controller 102 is connected is in series between the bus 110 and the I/O devices 120 and 122, and the slots to which the I/O devices 120 and 122 are connected are parallel to each other and in series between the controller 102 and the field devices 112–115 on the bus segment 124. While the physical connection of the devices to the bus 110 is primarily used for exchanging information between the devices and implementing process control, the physical connection may also be used to inform the I/O devices 120 and 122 and the other devices on the process control network 100 that the I/O devices 120 and 122 form a redundant pair of I/O devices.

Moreover, the connection between the controller 102 and the I/O devices 120 and 122 may be used to control the switchover of the backup I/O device 122 to the active mode. For example, the I/O devices 120 and 122 may be configured to transmit status information to the controller 102. The status information may include alarm messages with information that the active I/O device 120 has or is about to become disabled. The controller 102 may be programmed to respond to an alarm message by switching the operating modes of the I/O devices 120 and 122 such that the active I/O device 120 assumes the backup mode, and the backup I/O device 122 assumes the active mode. The controller 102 may further be programmed to transmit a message to a host 104 indicating that the I/O device 120 requires maintenance.

Figure 8:
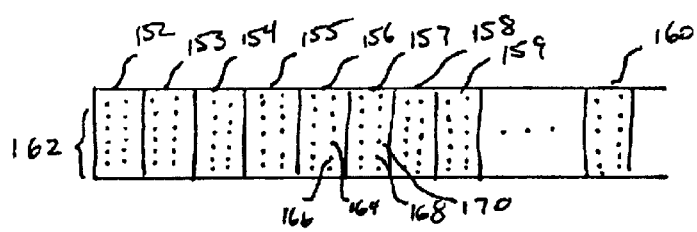
FIG. 8 is a schematic diagram of the backplane for implementing the redundant bus I/O devices of FIG. 6.

FIG. 8 illustrates a schematic representation of the backplane 150 of FIG. 7. The backplane 150 includes a plurality of slots 152–160, each capable of connecting a device to the bus 110. Each slot 152–160 has a plurality of pins 162 that are inserted into associated ports on the devices connected thereto to establish an electrical connection between the bus 110 and the devices. Additionally, the backplane 150 is configured with the appropriate electrical connections between the slots 152–160 to properly interconnect the devices connected to the slots 152–160, such as the interconnections for the bus segment 124 described above. In addition, the backplane 150 and/or the I/O devices 120 and 122 may be configured to implement the redundant I/O devices.

One alternative configuration for implementing the redundant I/O devices is to designate specific slots on the backplane 150 for the primary and secondary I/O devices that comprise the redundant pair. For example, it may be predetermined that, for the process control network 100, the fifth slot 156 and sixth slot 157 on the backplanes 150 for bus segments are reserved for the redundant I/O devices 120 and 122. Specifically, the primary I/O device is connected to the fifth slot 156 and the secondary I/O device is connected to the sixth slot 157. In this implementation of redundant I/O devices, the I/O devices 120 and 122 are programmed to recognize the connection to the fifth or sixth slots 156 or 157 and the designation as either the primary or the secondary I/O device depending on the slot 156 or 157 to which they are connected, and the associated default operating mode, either active or backup. Extending the example described above, the fifth slot 156 may be the slot location for the primary I/O device, and the sixth slot 157 may be the slot location for the secondary I/O device. When the I/O devices 120 and 122 are connected to the backplane, I/O device 120, as the primary I/O device, is connected to the fifth slot 156, and I/O device 122, the secondary device, is connected to the sixth slot 157. The I/O device 120 detects the connection to the fifth slot 156 and determines that it is the primary I/O device of a redundant pair of I/O devices and assumes the role of the active I/O device for the virtual I/O device 130. Similarly, the I/O device 122 detects the connection to the sixth slot 157 and determines that it is the secondary I/O device of a redundant pair of I/O devices and assumes the role of the backup I/O device for the virtual I/O device 130. Configured in this way, in the event that one or both of the I/O devices 120 and 122 becomes disabled, a replacement I/O device detects from its slot location that it is part of a redundant pair without the necessity and added delay of post-connection reprogramming of the device. Moreover, the other devices of the process control network 100, such as the hosts or operator workstations 104, may be programmed to sense the presence of redundant pairs of I/O devices. Upon sensing I/O devices 120 and 122 connected to the fifth and sixth slots 156 and 157, respectively, the host/operator workstations 104 may also automatically update the displays of the process control network 100 with the redundant I/O devices 120 and 122. Of course, the I/O devices may detect their connection to a specific slot and the redundant operation associated with that slot by the configuration of pins or other hardware (or software) on the back plane.

Another alternative configuration for implementing the redundant I/O devices without the necessity of post-connection programming of the I/O devices is to manipulate the voltage levels of the pins 162 to which the I/O devices are connected. Each of the slots 152–160 is illustrated with twelve pins 162 to connect the devices to the slots 152–160 of the backplane 150, although the use of more or fewer pins 162 is anticipated based on requirements of the hardware being connected to the bus 110. Two pins 162 in each slot are necessary to establish the relationship between the I/O devices 120 and 122: the first pin indicating that the slot is one of a pair of redundant I/O devices, and the second pin indicating whether the I/O device connected thereto is the primary or the secondary I/O device. Just as the I/O devices in the preceding example were programmed to detect the slot to which they were connected, the I/O devices in this alternative embodiment of the present invention are programmed to evaluate the voltage level of the designated pins to determine whether they are part of a redundant pair of I/O devices. In this example, the tenth pins 164 and 168 of the third and fourth slots 154 and 155, respectively, are set to high to indicate that the I/O devices connected thereto are part of a redundant pair of I/O devices. The eleventh pins 166 and 170 of the slots 154 and 155, respectively, are set to high to indicate that the slot 154 or 155 is the right slot of the redundant pair, and low to indicate that the slot 154 or 155 is the left slot of the redundant pair. The value of the eleventh pins 166 and 170 also determines which I/O device is the primary device and which is the secondary device. In the present example, a low value on the eleventh pin 166 or 170 indicates the primary I/O device. Consequently, in this example, both tenth pins 164 and 168 are set high, the eleventh pin 166 of third slot 154 is set low indicating that the slot 154 is the left slot of the pair and that the I/O device connected thereto is the primary I/O device, and the eleventh pin 170 of fourth slot 155 is set high indicating that the slot 155 is the right slot of the pair and that the I/O device connected thereto is the secondary I/O device. As in the preceding example, the I/O devices 120 and 122 are programmed to evaluate the tenth and eleventh pins of the slot to which they are connected to determine whether they are part of a redundant pair of I/O devices and whether they are the primary or secondary I/O devices.

Moreover, the host or operator workstations 104 may detect whether a redundant pair of I/O devices is connected to the bus segment 124 and display information related to the redundant pair of I/O devices to the users if such a pair is detected. The host or operator workstations 104 may include a user interface having a display for information regarding the process control network and its devices. In order to acquire the necessary process and device data, the host 104 may be configured with auto-sensing functionality whereby it periodically polls the nodes on the bus to determine whether devices are connected and, if devices are present, acquire information about the device for display to the users. The host 104 and/or field devices can be configured so that the auto-sensing functionality detects the presence of the redundant I/O devices 120 and 122. For example, the I/O devices 120 and 122 maybe programmed to transmit, and the host 104 maybe programmed to receive, messages indicating that the I/O devices 120 are redundant along with their current operating mode. Alternatively, the host 104 may be programmed in a similar manner to the I/O devices 120 and 122 with information that designated slots are reserved for redundant I/O devices 120 and 122, and detect when a device is connected to the designated slots. Other alternative configurations for having the host 104 detect the presence of the redundant I/O devices and displaying the information at the user interface are contemplated by the inventor and will be apparent to those skilled in the art.

While the redundant I/O devices described herein have been implemented in a process control network operating under a Fieldbus protocol, it is noted that the redundant I/O functionality described herein can be implemented using other types of programs, hardware, firmware, etc., associated with other types of control systems and/or communication protocols. In fact, while the Fieldbus protocol uses the term "function block" to describe a particular type of entity capable of performing a process control function, it is noted that the term function block as used herein is not so limited and includes any sort of device, program, routine, or other entity capable of performing a process control function in any manner at distributed locations within a process control network. Thus, the redundant I/O devices described and claimed herein can be implemented in process control networks that use other process control communication protocols or schemes (that may now exist or that may be developed in the future) as long as these networks or protocols provide for or allow control functions to be performed at distributed locations within a process. Moreover, while the embodiments disclosed herein are directed to redundant I/O devices, it is noted that the redundant functionality described herein can be implemented using other types of devices for which it is desired to implement redundancy in the process control network.

Thus, while the present invention has been described with reference to specific examples, which are intended to be illustrative only and not to be limiting of the invention, it will be apparent to those of ordinary skill in the art that changes, additions or deletions maybe made to the disclosed embodiments without departing from the spirit and scope of the invention.

What is claimed is:

1. A process control system for communications in a process control network having a plurality of devices each having a unique address, the process control system comprising:

a process control network bus;
a primary redundant device having a first unique address communicatively linked to the process control network bus and programmed to publish messages on the process control network bus including a virtual publishing address;
a secondary redundant device having a second unique address communicatively linked to the process control network bus and programmed to publish messages on the process control network bus including the virtual publishing address; and
at least one receiving device communicatively linked to the process control network bus and programmed to process messages published on the process control network bus containing the virtual publishing address;
wherein the primary redundant device operates in an active mode whereby the primary redundant device transmits messages on the process control network bus for the at least one receiving device, and the secondary redundant device operates in a backup mode whereby the secondary device does not transmit messages on the process control network bus.

2. A process control system according to claim 1, wherein the secondary redundant device operates in the active mode when the primary redundant device is disabled.

3. A process control system according to claim 2, wherein the secondary redundant device determines that the primary redundant device is disabled based on the failure of the primary redundant device to transmit messages containing the virtual publishing address on the process control network bus.

4. A process control system according to claim 2, further comprising a controller communicatively linked to the primary and secondary redundant devices and programmed to receive status information from the primary and secondary redundant devices and, upon receiving status information indicating that the primary redundant device is or is about to become disabled, causes the primary redundant device to operate in the backup mode and the secondary redundant device to operate in the active mode.

5. A process control system according to claim 2, wherein the primary and secondary redundant devices are communicatively connected by a communication link external to the process control network bus and the primary redundant device is programmed to transmit status information indicating that the primary redundant device is or is about to become disabled to the secondary redundant device via the communication link.

6. A process control system according to claim 1, wherein the primary and secondary redundant devices each have a publishing buffer for storing messages to be transmitted by the primary and secondary redundant devices on the process control network bus, and a subscribing buffer for storing messages received over the process control network bus, and wherein the secondary redundant device is programmed to process messages containing the virtual publishing address, to receive the messages transmitted on the process control network bus by the primary redundant device and containing the virtual publishing address, and to store the received messages in the publishing buffer of the secondary redundant device.

7. A process control system according to claim 1, wherein the primary and secondary redundant devices are programmed to process messages containing the unique address of at least one device, and the primary and secondary redundant devices receive and process messages containing the unique address of the at least one device while operating in the active mode and in the backup mode.

8. A process control system according to claim 1, wherein the process control network bus includes a first portion and a second portion, each of the first and second portions having at least one device communicatively linked thereto, wherein the primary and secondary redundant devices are communicatively linked in parallel to each other and in series between the first portion and the second portion of the process control network bus.

9. A process control system according to claim 1, wherein the primary and secondary redundant devices are communicatively connected by a communication link external to the process control network bus.

10. A process control system according to claim 1, wherein the primary and secondary redundant devices are configured to detect the presence of the other of the primary and secondary redundant devices and to determine which of the primary and secondary redundant devices will operate in the active mode and which will operate in the backup mode.

11. A process control system according to claim 1, wherein the devices are communicatively linked to the process control network bus via slots, the system further comprising:
 a first slot communicatively connecting the primary redundant device to the process control network bus; and
 a second slot communicatively connecting the secondary redundant device to the process control network bus;
 wherein the primary and secondary redundant devices are configured to determine that the primary redundant device is connected to the first slot and to operate in the active mode based upon the determination that the primary redundant device is connected to the first slot, and to determine that the secondary redundant device is connected to the second slot and to operate in the backup mode based upon the determination that the secondary redundant device is connected to the second slot.

12. A process control system according to claim 11, wherein the first and second slots each include a plurality of pins connecting the first and second redundant devices to the first and second slots respectively, and each pin having an associated voltage level, whereby the primary and secondary redundant devices determine that the primary redundant device is connected to the first slot and the secondary redundant device is connected to the second slot based on the voltage levels of the pins.

13. A process control system according to claim 1, further comprising a host device having a display communicatively linked to the process control network bus, the host device being configured to detect the presence of the primary and secondary redundant devices, to detect the operation of the primary redundant device in the active mode and the operation of the secondary redundant device in the backup mode, and to display on the display of the host device the presence of the primary and secondary redundant devices, the operation of the primary redundant device in the active mode, and the operation of the secondary device in the backup mode.

14. A process control system according to claim 1, wherein the virtual publishing address is one of the first unique address and the second unique address.

15. A process control system according to claim 1, wherein the primary and secondary redundant devices are I/O devices.

16. A method of implementing redundant devices within a process control system for communications in a process control network having a plurality of devices communicatively linked over a process control network bus, wherein each of the devices has a unique address and is capable of communicating on the bus, the method comprising:
 configuring a primary redundant device having a first unique address and a secondary redundant device having a second unique address to transmit messages containing a virtual publishing address on the process control network bus;
 operating the primary redundant device in an active mode whereby the primary redundant device transmits messages containing the virtual publishing address on the bus;
 operating the secondary redundant device in a backup mode whereby the secondary redundant device does not transmit messages on the process control network bus; and
 receiving messages containing the virtual publishing address at least one receiving device configured to process messages containing the virtual publishing address.

17. A method of implementing redundant devices within a process control system in a process control network according to claim 16, further comprising the step of configuring the secondary redundant device to operate in the active mode when the primary redundant device is disabled.

18. A method of implementing redundant devices within a process control system in a process control network according to claim 17, further comprising the step of configuring the secondary redundant device to determine that the primary redundant device is disabled based on the failure of the primary redundant device to transmit messages containing the virtual publishing address on the process control network bus.

19. A method of implementing redundant devices within a process control system in a process control network according to claim 16, further comprising:
 transmitting on the process control network bus status information indicating that the primary redundant device is or is about to become disabled from the primary redundant device in a message containing the virtual publishing address while the primary redundant device is operating in the active mode;
 configuring the secondary redundant devices to process messages containing the virtual publishing address; and
 causing the secondary redundant device to operate in the active mode upon receiving the message containing the virtual publishing address and the status information.

20. A method of implementing redundant devices within a process control system in a process control network according to claim 16, further comprising:
 communicatively connecting the primary and secondary redundant devices by a communication link external to the process control network bus; and
 transmitting status information indicating that the one of the primary and secondary redundant devices operating in the active mode is or is about to become disabled from the one of the primary and secondary redundant devices operating in the active mode to the other of the primary and secondary redundant devices via the communication link.

21. A method of implementing redundant devices within a process control system in a process control network according to claim 16, wherein the primary and secondary redundant devices each have a publishing buffer for storing messages to be transmitted by the primary and secondary redundant devices on the bus, and a subscribing buffer for storing messages received over the process control network bus, the method further comprising:

configuring the primary and secondary redundant devices to detect messages containing the virtual publishing address;

transmitting messages containing the virtual publishing address on the process control network bus from the primary redundant device;

detecting at the primary redundant device messages containing the virtual publishing address; and storing the detected messages containing the virtual publishing address in the publishing buffer of the secondary redundant device.

22. A method of implementing redundant devices within a process control system in a process control network according to claim 16, further comprising:

configuring the primary and secondary redundant devices to process messages containing the unique address of at least one device;

receiving messages containing the unique address of the at least one device; and processing the messages containing the unique address of the at least one device at the primary and secondary redundant devices while operating in the active mode and in the backup mode.

23. A method of implementing redundant devices within a process control system in a process control network according to claim 16, wherein the process control network bus has a first portion and a second portion each having at least one device communicatively linked to the process control network bus, the method further comprising communicatively linking the primary and secondary redundant devices in parallel to each other and in series between the first portion and the second portion of the process control network bus.

24. A method of implementing redundant devices within a process control system in a process control network according to claim 16, further comprising communicatively connecting the primary and secondary redundant devices by a communication link external to the process control network bus.

25. A method of implementing redundant devices within a process control system in a process control network according to claim 16, further comprising:

configuring the primary and secondary redundant devices to detect the connection of the other of the primary and secondary redundant devices;

detecting at the primary redundant device the connection of the secondary redundant device, and at the secondary redundant device the connection of the primary redundant device;

causing the primary redundant device to operate in the active mode based on the connection of the secondary redundant device; and causing the secondary redundant device to operate in the backup mode based on the connection of the primary redundant device.

26. A method of implementing redundant devices within a process control system in a process control network according to claim 16, wherein the devices are communicatively linked to the process control network bus via slots, the method further comprising:

communicatively connecting the primary redundant devices to the process control network bus via a first slot;

communicatively connecting the secondary redundant devices to the bus via a second slot;

causing the primary redundant device to determine the connection to the process control network bus via the first slot and to operate in the active mode based upon the determination that the primary redundant device is connected to the process control network bus via the first slot; and causing the secondary redundant device to determine the connection to the process control network bus via the second slot and to operate in the backup mode based upon the determination that the secondary redundant device is connected to the process control network bus via the second slot.

27. A method of implementing redundant devices within a process control system in a process control network according to claim 26, wherein the first and second slots each include a plurality of pins connecting the first and second redundant devices to the first and second slots, respectively, and each pin having an associated voltage level, the method further comprising:

determining that the primary redundant device is connected to the process control network bus via the first slot based on the voltage levels of the pins of the first slot; and determining that the secondary redundant device is connected to the bus via the second slot based on the voltage levels of the pins of the second slot.

28. A method of implementing redundant devices within a process control system in a process control network according to claim 16, wherein a host device having a display is communicatively linked to the process control network bus, the method further comprising:

detecting at the host device the presence of the primary and secondary redundant devices, the operation of the primary redundant device in the active mode, and the operation of the secondary redundant device in the backup mode; and displaying on the display of the host device indicia of the presence of the primary and secondary redundant devices, the operation of the primary redundant device in the active mode, and the operation of the secondary redundant device in the backup mode.

29. A method of implementing redundant devices within a process control system in a process control network according to claim 16, wherein the virtual publishing address is one of the first unique address and the second unique address.

30. A method of implementing redundant devices within a process control system in a process control network according to claim 16, wherein the primary and secondary redundant devices are I/O devices.

31. A redundant pair of devices in a process control network having a plurality of devices communicatively linked over a process control network bus, wherein each of the devices has a unique address and is capable of communicating on the process control network bus, at least one device being programmed to process messages published on the process control network bus containing a virtual publishing address, the redundant pair of devices comprising:

a primary redundant device having a first unique address communicatively linked to the process control network bus and programmed to publish messages on the process control network bus including the virtual publishing address; and a secondary redundant device having a second unique address communicatively linked to the process control network bus and programmed to publish messages on the process control network bus including the virtual publishing address;

wherein the primary redundant device operates in an active mode whereby the primary redundant device transmits messages on the process control network bus for the at least one receiving device, and the secondary redundant device operates in a backup mode whereby the secondary device does not transmit messages on the process control network bus.

32. A redundant pair of devices according to claim 31, wherein the secondary redundant device operates in the active mode when the primary redundant device is disabled.

33. A redundant pair of devices according to claim 32, wherein the secondary redundant device determines that the primary redundant device is disabled based on the failure of the primary redundant device to transmit messages containing the virtual publishing address on the process control network bus.

34. A redundant pair of devices according to claim 32, further comprising a controller communicatively linked to the primary and secondary redundant devices and programmed to receive status information from the primary and secondary redundant devices and, upon receiving status information indicating that the primary redundant device is or is about to become disabled, causes the primary redundant device to operate in the backup mode and the secondary redundant device to operate in the active mode.

35. A redundant pair of devices according to claim 32, wherein the primary and secondary redundant devices are communicatively connected by a communication link external to the process control network bus and the primary redundant device is programmed to transmit status information indicating that the primary redundant device is or is about to become disabled to the secondary redundant device via the communication link.

36. A redundant pair of devices according to claim 31, wherein the primary and secondary redundant devices each have a publishing buffer for storing messages to be transmitted by the primary and secondary redundant devices on the process control network bus, and a subscribing buffer for storing messages received over the process control network bus, and wherein the secondary redundant device is programmed to process messages containing the virtual publishing address, to receive the messages transmitted on the process control network bus by the primary redundant device and containing the virtual publishing address, and to store the received messages in the publishing buffer of the secondary redundant device.

37. A redundant pair of devices according to claim 31, wherein the primary and secondary redundant devices are programmed to process messages containing the unique address of at least one device, and the primary and secondary redundant devices receive and process messages containing the unique address of the at least one device while operating in the active mode and in the backup mode.

38. A redundant pair of devices according to claim 31, wherein the bus includes a first portion and a second portion, each of the first and second portions having at least one device communicatively linked thereto, wherein the primary and secondary redundant devices are communicatively linked in parallel to each other and in series between the first portion and the second portion of the process control network bus.

39. A redundant pair of devices according to claim 31, wherein the primary and secondary redundant devices are communicatively connected by a communication link external to the process control network bus.

40. A redundant pair of devices according to claim 31, wherein the primary and secondary redundant devices are configured to detect the presence of the other of the primary and secondary redundant devices and to determine which of the primary and secondary redundant devices will operate in the active mode and which will operate in the backup mode.

41. A redundant pair of devices according to claim 31, wherein the primary redundant device is communicatively linked to the process control network bus via a first slot and the secondary redundant device is communicatively linked to the process control network bus via a second slot, and wherein the primary and secondary redundant devices are configured to determine that the primary redundant device is connected to the first slot and to operate in the active mode based upon the determination that the primary redundant device is connected to the first slot, and to determine that the secondary redundant device is connected to the second slot and to operate in the backup mode based upon the determination that the secondary redundant device is connected to the second slot.

42. A redundant pair of devices according to claim 41, wherein the first and second slots each include a plurality of pins connecting the first and second redundant devices to the first and second slots respectively, and each pin having an associated voltage level, whereby the primary and secondary redundant devices determine that the primary redundant device is connected to the first slot and the secondary redundant device is connected to the second slot based on the voltage levels of the pins.

43. A redundant pair of devices according to claim 31, wherein the virtual publishing address is one of the first unique address and the second unique address.

44. A redundant pair of devices according to claim 31, wherein the primary and secondary redundant devices are I/O devices.

\* \* \* \* \*

UNITED STATES PATENT AND TRADEMARK OFFICE
CERTIFICATE OF CORRECTION

PATENT NO. : 6,742,136 B2
DATED : May 25, 2004
INVENTOR(S) : Daniel D. Christensen et al.

It is certified that error appears in the above-identified patent and that said Letters Patent is hereby corrected as shown below:

Column 1,
Line 16, please delete "maybe" and insert -- may be --

Column 3,
Line 36, please delete "massages" and insert -- messages --

Column 9,
Line 1, please delete "maybe" and insert -- may be --

Column 21,
Lines 19 and 20, please delete "maybe" and insert -- may be --

Column 24,
Lines 2, 11 and 65, please insert -- process control network -- before "bus"

Column 25,
Line 67, please insert -- process control network -- before "bus"

Column 26,
Line 25, please insert -- process control network -- before "bus"

Column 28,
Line 5, please insert -- process control network -- before "bus"

Signed and Sealed this

Twelfth Day of April, 2005

JON W. DUDAS
*Director of the United States Patent and Trademark Office*